US010670038B2

(12) United States Patent
De Gaillard et al.

(10) Patent No.: US 10,670,038 B2
(45) Date of Patent: Jun. 2, 2020

(54) BLADE MADE OF COMPOSITE MATERIAL WITH INTEGRATED PLATFORM FOR AN AIRCRAFT TURBINE ENGINE

(71) Applicant: SAFRAN AIRCRAFT ENGINES, Paris (FR)

(72) Inventors: Thomas Alain De Gaillard, Paris (FR); William Henri Joseph Riera, Coubert (FR); Guillaume Olivier Vartan Martin, Cesson (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 222 days.

(21) Appl. No.: 15/982,880

(22) Filed: May 17, 2018

(65) Prior Publication Data

US 2018/0334911 A1    Nov. 22, 2018

(30) Foreign Application Priority Data

May 19, 2017    (FR) ...................................... 17 54437

(51) Int. Cl.
| F04D 29/32 | (2006.01) |
| F01D 5/30 | (2006.01) |
| F01D 11/00 | (2006.01) |

(52) U.S. Cl.
CPC ......... *F04D 29/322* (2013.01); *F01D 5/3007* (2013.01); *F01D 11/006* (2013.01);
(Continued)

(58) Field of Classification Search
CPC ........ F01D 5/30; F01D 5/3007; F01D 5/3015; F01D 5/32; F01D 5/326; F01D 5/143;
(Continued)

(56) References Cited

U.S. PATENT DOCUMENTS

| 5,853,286 A | 12/1998 | Bussonnet et al. |
| 2007/0020102 A1* | 1/2007 | Beeck .................. F01D 5/3007 416/219 R |

(Continued)

FOREIGN PATENT DOCUMENTS

| EP | 0786581 A1 | 7/1997 |
| EP | 1526285 A1 | 4/2005 |

(Continued)

OTHER PUBLICATIONS

Search report received for GB Patent Application No. 1808041.6, dated Nov. 6, 2018, 3 pages.
(Continued)

*Primary Examiner* — Richard A Edgar
(74) *Attorney, Agent, or Firm* — Womble Bond Dickinson (US) LLP

(57) ABSTRACT

Blade made of composite material, with an integrated platform, for an aircraft turbine engine, including a root connected to an aerofoil and having a connection platform between the root and the aerofoil, the root having a generally elongate shape along an axis (A) of elongation, the aerofoil having a curved cross-sectional shape and including a pressure face and a suction face, the platform including a first portion extending on the pressure-face side of the aerofoil and including a first longitudinal free edge and a second opposite longitudinal edge for connecting to the rest of the blade, the platform including a second portion extending on the suction-face side of the aerofoil and comprising a third longitudinal free edge and an opposite fourth longitudinal edge for connecting to the rest of the blade, wherein the first longitudinal free edge is concave and the third longitudinal free edge is convex, and, for any plane (P, P') perpendicular to the axis of elongation and intersecting the platform, the distance (L1, L2; L1', L2') between the first and second edges, on the one hand, and the distance between said third
(Continued)

and fourth edges, on the other hand, are identical in the plane considered.

7 Claims, 3 Drawing Sheets

(52) U.S. Cl.
CPC .... *F05D 2220/323* (2013.01); *F05D 2220/36* (2013.01); *F05D 2230/60* (2013.01); *F05D 2240/30* (2013.01); *F05D 2240/80* (2013.01); *F05D 2300/603* (2013.01)

(58) Field of Classification Search
CPC ...... F01D 5/141; F01D 11/006; F01D 11/008; F04D 29/322; F04D 29/325

See application file for complete search history.

(56) References Cited

U.S. PATENT DOCUMENTS

| 2010/0166562 | A1* | 7/2010 | Boyer | F01D 5/3007 416/219 R |
|---|---|---|---|---|
| 2017/0326757 | A1 | 11/2017 | Marin et al. | |

FOREIGN PATENT DOCUMENTS

| FR | 3037097 A1 | 12/2016 |
|---|---|---|
| WO | 2013/104852 A2 | 7/2013 |
| WO | 2014/076408 A1 | 5/2014 |
| WO | 2017/158266 A1 | 9/2017 |

OTHER PUBLICATIONS

Preliminary Research Report received for French Application No. 1754437, dated Jan. 10, 2018, 3 pages (1 page of French Translation Cover Sheet and 2 pages of original document).

* cited by examiner

BLADE MADE OF COMPOSITE MATERIAL WITH INTEGRATED PLATFORM FOR AN AIRCRAFT TURBINE ENGINE

TECHNICAL FIELD

The present invention concerns in particular a blade made of composite material and with an integrated platform, for an aircraft turbine engine, as well as a method for assembling an aircraft turbine engine wheel.

PRIOR ART

The prior art includes, in particular, the documents EP-A1-1 526 285, WO-A2-2013/104852, WO-A1-2014/076408 and FR-A1-3 037 097.

Production of blades made from composite material for turbine engines has already been proposed. Reference could be made, for example, to EP-A1-1 526 285, which describes the manufacture of a fan blade by producing a fibrous preform by three-dimensional weaving and densification of the preform by an organic matrix.

In addition, a turbine engine fan comprises platforms which are disposed between the blades in order to define, on the inner side, the annular air intake flow path in the fan, the flow path being defined on the outer side by a housing. These platforms can be connected separately or be integrated directly at the base of the fan blades, between the strut prolonging their root and the aerofoil of same. The invention relates more particularly to the blades belonging to the second category, i.e. having integrated platforms.

A blade 10 with integrated platform, such as illustrated in FIG. 1, thus comprises a root 12 connected to an aerofoil 16 by having a platform 14 at the connection between the root and the aerofoil. The root 12 has a generally elongate shape along an axis of elongation A, which may be curved. The aerofoil 16 has a curved cross-sectional shape and comprises a pressure face 18 (or concave profile also called intrados) and a suction face 20 (or convex profile also called extrados). The platform 14 comprises two portions 14a, 14b extending respectively on the pressure-face side and on the suction face of the aerofoil. The portions 14a, 14b of the platform each comprise a free longitudinal edge 14aa, 14ba which is straight or curved and which is intended to have a shape that is complementary to the facing free longitudinal edge of an adjacent blade, in order to guarantee sealing of the flow path on the inside. As can be seen from FIG. 1, the width L of one portion 14a of platform 14 (or the distance between the free edge of the platform 14 and the aerofoil 16) can be varied along the axis of elongation A of the root 12 and can be different from the width L' of the other platform portion 14b. These widths L, L' are substantially measured in planes perpendicular to the axis of elongation A mentioned above and intersecting the platform 14.

A blade of this type is mounted on a disc by fitting its root into a socket of complementary shape of the periphery of the disc. In operation, the wheel formed by the disc and its blades is rotated about its axis and the blades are subject, in particular, to centrifugal forces.

The sizing of the platform integrated with each blade should take account of specifications in terms of radial movement (with respect to the axis of rotation of the wheel) under centrifugal forces, in order to meet the aerodynamic criteria. The radial movement on the pressure-face side and suction-face side must be limited. Moreover, in order to ensure continuity of the flow path, the pressure-face side radial movements should be of the same order of magnitude as the radial movements of the suction face, in order to avoid the formation of play or steps which can disturb the flow between the platforms.

However, in the prior art, an integrated platform does not make it possible to meet the specifications of movement. In the above-mentioned portions 14a, 14b of the platform 14, the portions Z (FIG. 2) having greater width and thus having greater overhang are subject to significant movements when the blade is subjected to the centrifugal forces (FIG. 2).

The present invention proposes a simple, effective and economical solution to this problem.

DISCLOSURE OF THE INVENTION

The invention proposes, for this purpose, a rotor blade made of composite material and with an integrated platform, for an aircraft turbine engine, comprising a root connected to an aerofoil and having a connection platform between the root and the aerofoil, the root having a generally elongate shape along an axis of elongation which is substantially parallel to an axis of rotation of the blade, the aerofoil having a curved cross-sectional shape and comprising a pressure face and a suction face, the platform comprising a first portion extending on the pressure-face side of the aerofoil and comprising a first longitudinal free edge and a second opposite longitudinal edge for connecting to the rest of the blade, the platform comprising a second portion extending on the suction-face side of the aerofoil and comprising a third longitudinal free edge and an opposite fourth longitudinal edge for connecting to the rest of the blade, the first longitudinal free edge being concave and the third longitudinal free edge being convex, characterised in that, for any plane perpendicular to said axis of elongation and intersecting said platform, the distance between the first and second edges, and the distance between the third and fourth edges, are identical in the plane considered.

In the present application, a distance "identical" to another distance shall mean that this distance is equal to K times the other distance. K is close to or even equal to 1. It is preferably between 0.9 and 1.

The invention makes it possible to eliminate the Z portions of greater width of the prior art, which have no counterparts of the same width on the other side of the blade. Indeed, the side portions of each platform are designed to have equal widths in each of the above-mentioned planes, i.e. over their entire length (along the axis of elongation) and thus to be subject to the same deformation stresses under centrifugal forces. Of course, the width of a portion of platform can vary along the axis of elongation, this variation always however being the same as that of the other platform portion.

The blade according to the invention may comprise one or more of the following features, taken singularly or in combination with each other:
- the root has a substantially dovetail cross-sectional shape,
- the blade comprises a woven fibrous base, embedded in a polymerised resin,
- the first and second platform portions each comprise at least one layer of fibres.

The present invention also concerns an aircraft turbine engine wheel, comprising a disc and a plurality of blades such as described above, the roots of which are fitted into sockets of complementary shape arranged in the disc.

The present invention also concerns a method for assembling a wheel such as described above, each blade being individually mounted by fitting its root into one of the sockets of the disc, by movement of the root in the socket, both along an axis of rotation of the wheel and then radially towards the interior with respect to this axis of rotation.

The present invention also concerns a method for assembling a wheel such as described above, the blades being simultaneously mounted by fitting their roots into the sockets of the disc, the method comprising:
- a step of pre-mounting of the blades on a ring having a variable diameter, the blades being arranged next to one another as they should be on the disc,
- a step of reducing the diameter of the ring in such a way that the roots of the blades are arranged on a circumference of similar diameter to that of a circumference passing through the sockets of the disc,
- a step of axial alignment of the ring and the disc and of axial movement of the ring carrying the blades towards the disc, until the roots of the blades engage in the sockets of the disc, and
- a step of rigidly attaching the blades of the ring and removal of the ring.

DESCRIPTION OF THE DRAWINGS

The invention will be better understood and other details, features and advantages of the invention will appear more clearly on reading the following description, provided by way of a non-limiting example and with reference to the attached drawings, in which.

DETAILED DESCRIPTION

Figure 1:
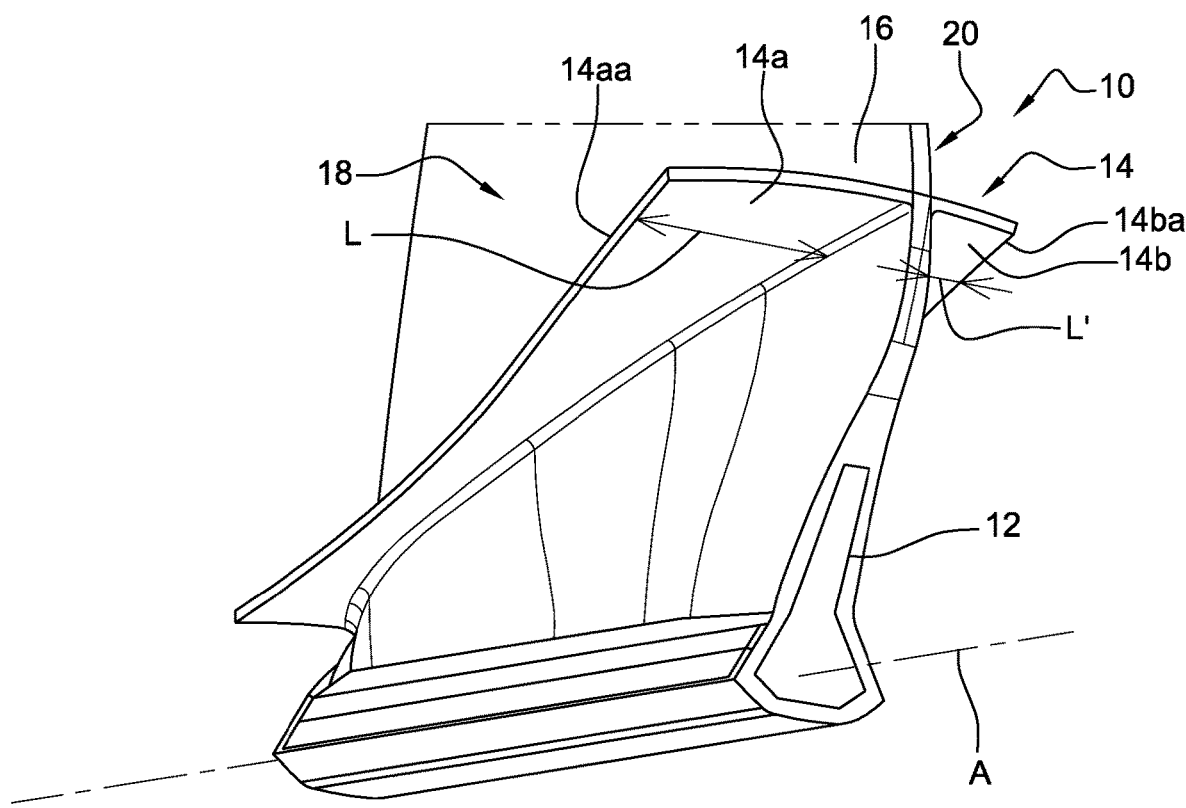
FIG. 1 is a partial schematic perspective view of a composite blade with integrated platform, of the prior art.
Figure 2:
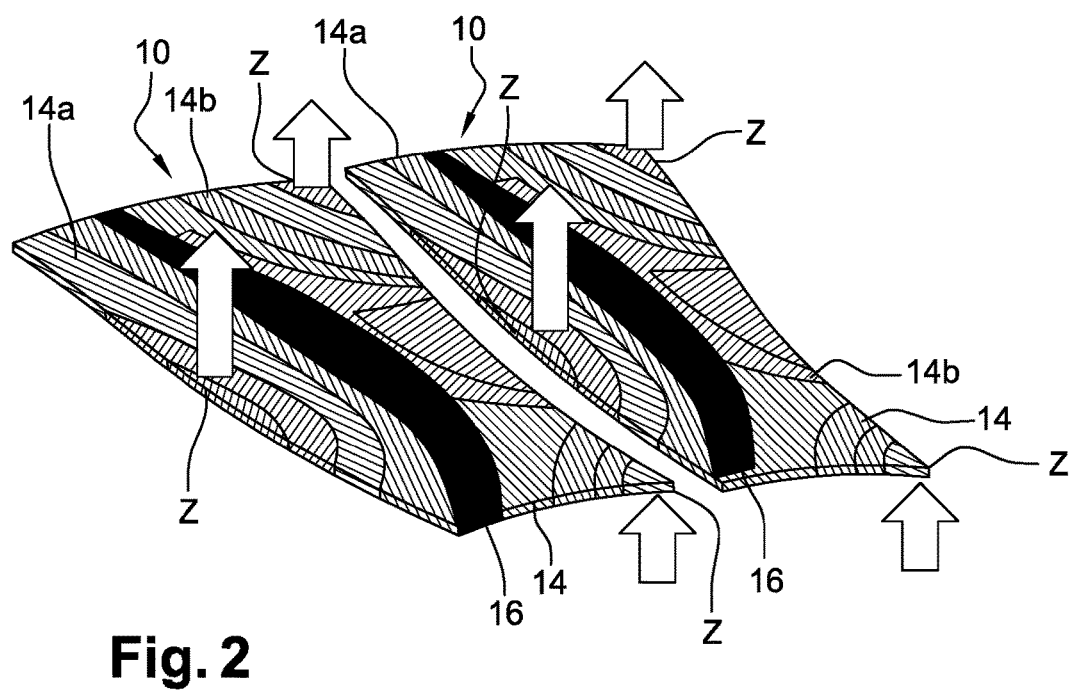
FIG. 2 is a highly schematic view of the platforms of two adjacent blades of the prior art, and shows the movement stresses of these platforms under centrifugal forces.
Figures 3, 4:
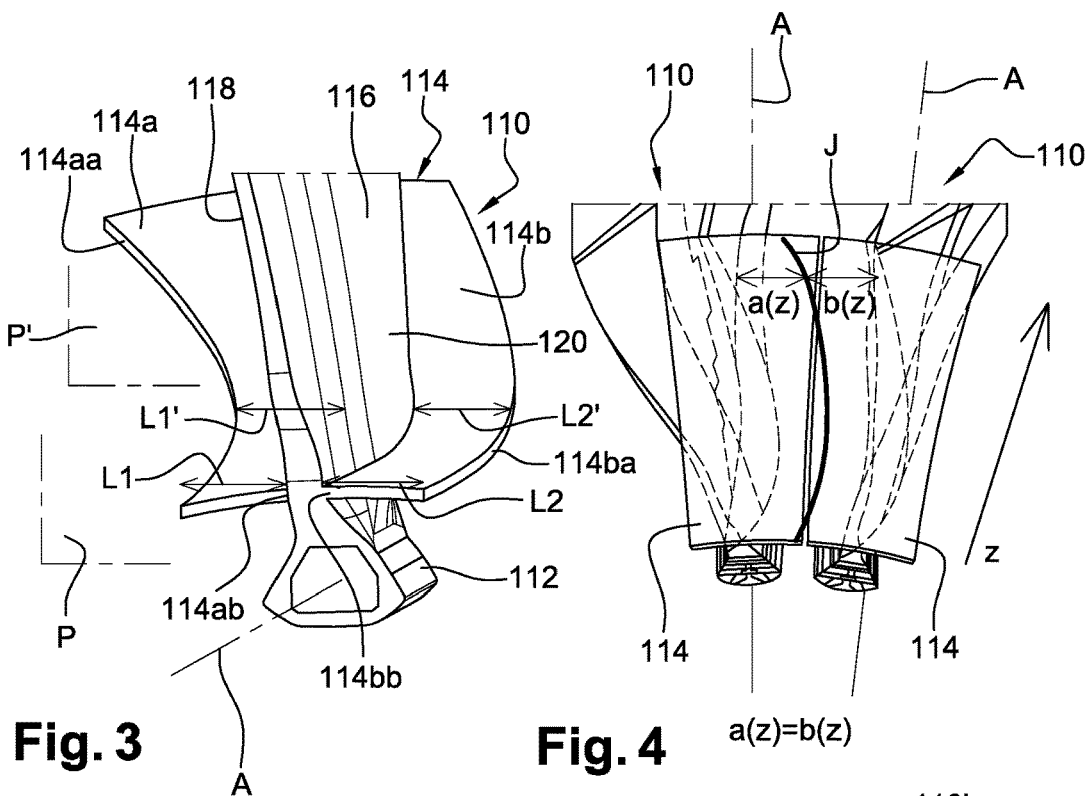
FIG. 3 is a partial schematic perspective view of a composite blade with integrated platform according to the invention.
FIG. 4 is a schematic view of two adjacent blades according to the invention.

The blade 110 with integrated platform of FIG. 3 represents an embodiment of the invention. The blade 110 comprises a woven fibrous base, embedded in a polymerised resin.

The blade 110 comprises a root 112 connected to an aerofoil 116 by having a platform 114 at the connection between the root and the aerofoil. The platform extends transverse to the aerofoil, being radially situated at the point of connection of the root and the aerofoil. The root 112 has a generally elongate shape along an axis of elongation A, which may be curved.

The aerofoil 116 has a curved cross-sectional shape and comprises a pressure face 118 and a suction face 120. The platform 114 comprises two portions 114a, 114b extending respectively on the pressure-face side and on the suction-face side of the aerofoil. The portions 114a, 114b of the platform each comprise at least one layer of fibres.

The portion 114a comprises a first longitudinal free edge 114aa and an opposite second longitudinal edge 114ab for connection to the rest of the blade. The portion 114a comprises a third longitudinal free edge 114ba and an opposite fourth longitudinal edge 114bb for connection to the rest of the blade.

The free edges 114aa, 114ba are curved and substantially followed the profiles of the pressure face 118 and the suction face 120, respectively. The first longitudinal free edge 114aa is thus concave and the third longitudinal free edge 114ba is convex. These free edges 114aa, 114ba have complementary shapes, as can be seen in FIG. 4. In the mounted position at the periphery of the disc, the facing edges 114aa, 114ba of two adjacent blades 110 are separated from each other by a predetermined and substantially constant circumferential clearance J, over the entire length of the platform 114 along the axis A.

According to the invention, for any plane perpendicular to the axis of elongation A and intersecting the platform 114, the distance L1 between the edges 114aa, 114ab of the portion 114a, on the one hand, and the distance L2 between the edges 114ba, 114bb of the portion 114b, on the other hand, are identical in the plane considered. In the plane P, distances L1 and L2 are identical; in the plane P', distances L1' and L2' are identical (and may be different from or identical to the distances L1 and L2).

The solution proposed thus consists of designing the platform 114 such that the overhang between the portions on the pressure-face side and suction-face side are identical (iso-overhang) on each section and allow a balance of movements between these portions at the axial iso-position (measured on the axis of rotation of the blades and therefore of the wheel comprising these blades).

FIGS. 5a to 5d illustrate the steps of a first embodiment of a method for assembling a wheel, consisting of a disc and a plurality of blades according to the invention mounted at the periphery of the disc.

In this case, the roots of the blades have a substantially dovetail cross-sectional shape. They are intended to be mounted by male-female fitting in the sockets (not illustrated) of complementary shape arranged at the periphery of the disc. Conventionally, the axes of elongation of the roots of the blades are aligned with the axes of the sockets and the blades are moved towards the disc until their roots are fitted in the sockets.

Figures 5A, 5B:
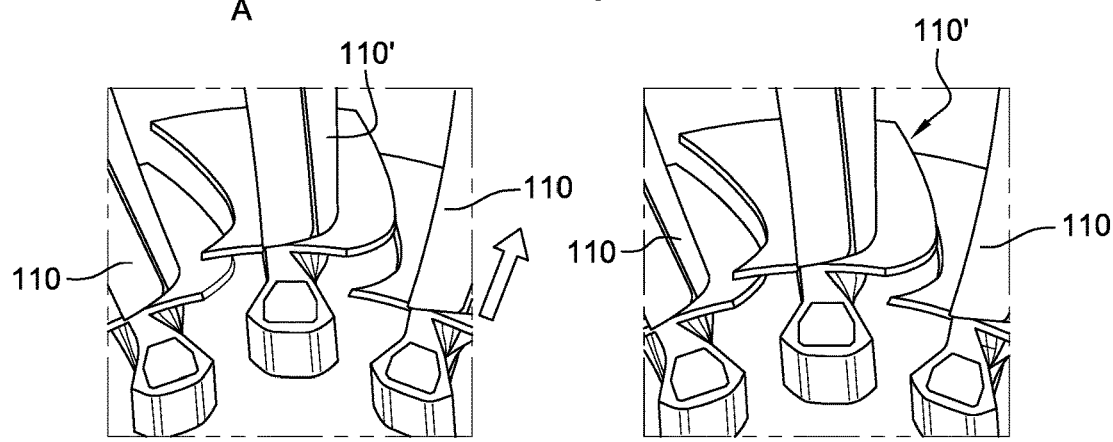
FIGS. 5a to 5d are schematic perspective views of blades according to the invention arranged at the periphery of the disc (not illustrated), and illustrate steps of assembly of these blades during an embodiment of a method of assembling a wheel, according to the invention.
Figures 5C, 5D:
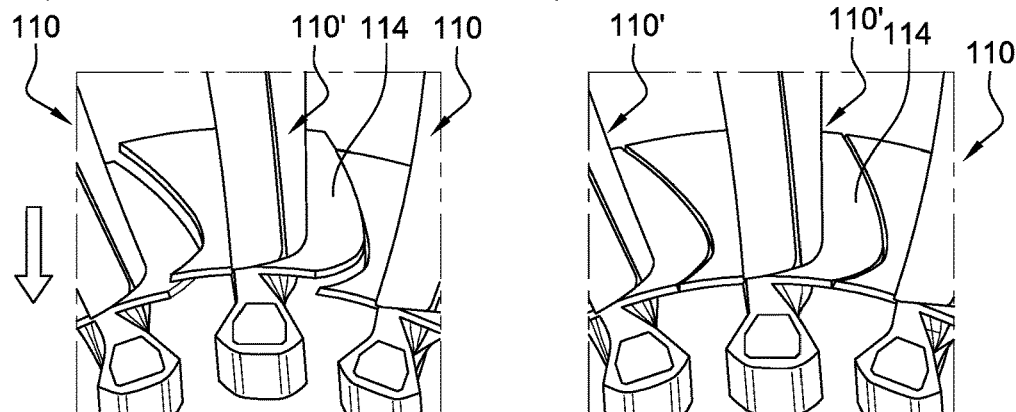
Figure 6A:
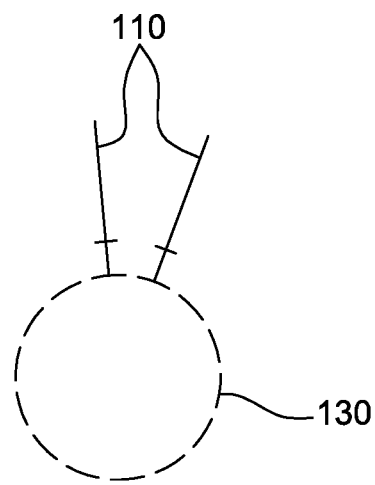
FIGS. 6a to 6d are schematic perspective views of blades according to the invention arranged at the periphery of the disc (not illustrated) and illustrating the steps of assembly of these blades during an embodiment of a method of assembling a wheel, according to the invention.
Figure 6B:
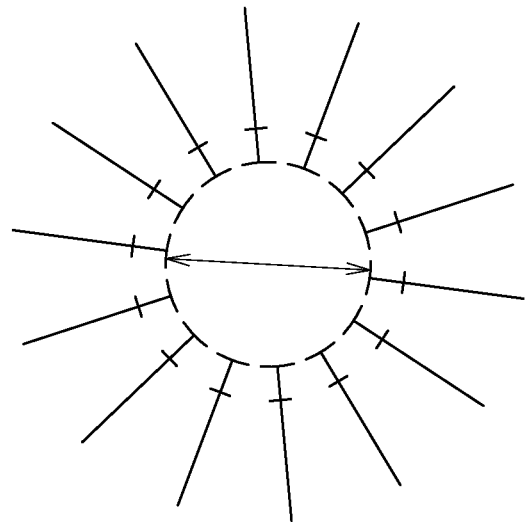
Figure 6C:
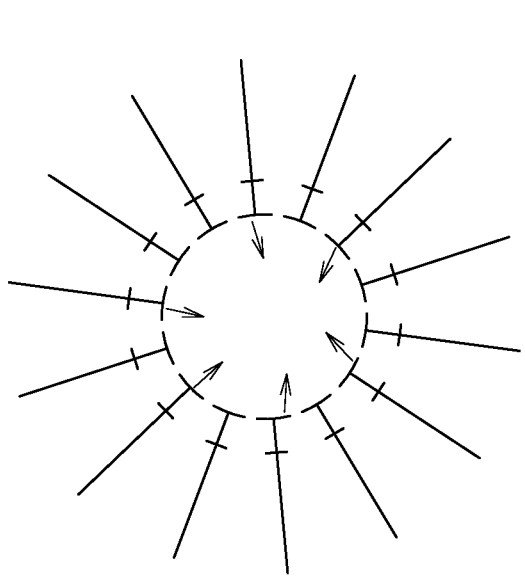
Figure 6D:
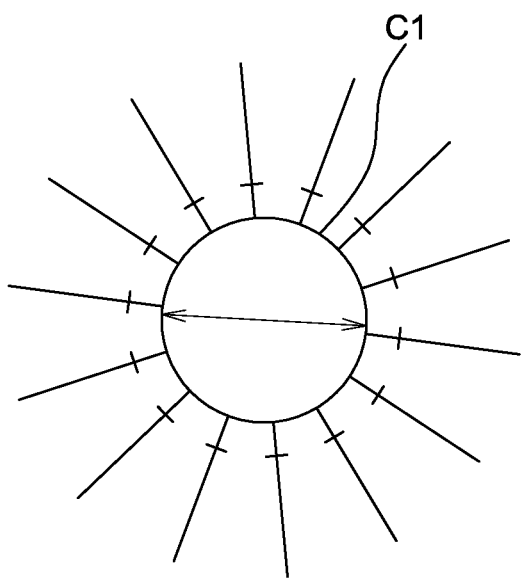

In the method of FIGS. 5a to 5d, the blades 110, 110' are mounted one after another on the periphery of the disc. The figures show two blades 110 already mounted on the disc, and a third intermediate blade 110' intended to be mounted between the two blades 110. The blade 110' can be mounted individually by fitting its root into one of the sockets of the disc, by moving the root into the socket along the axis of rotation of the wheel (FIGS. 5a and 5b), and then radially towards the inside with respect to this axis of rotation (FIGS. 5c and 5d).

This is made possible by the fact that the socket is oversized in the radial direction with respect to the (dovetail-shaped) bulb of the root, the bottom of the socket being in general intended to receive a shim which enables the bulb to be pressed radially outwards against the side spans of the socket. If the mounting space of the shim is not sufficient, increasing the size of the socket of the disc makes it possible to increase the leeway of mounting.

Such a mounting is also made possible owing to the curvature of the aerodynamic flow path, which allows a leeway for this mounting in axial translation. As can be seen in the drawings, during the radial movement towards the inside of the blade 110', there is no contact between its platform 114 and the platforms of the adjacent blades 110 (FIGS. 5c and 5d).

In the method of FIGS. 6a to 6d, the blades 110 are mounted simultaneously by fitting their roots into the sockets of the disc. The method comprises:
- a step of pre-mounting the blades 110 on a ring 130 having a variable diameter, the blades being arranged next to one another as they should be on the disc (FIGS. 6a and 6b),
- a step of reducing the diameter of the ring in such a way that the roots of the blades are arranged on a circumference C1 of similar diameter to that of a circumference passing through the sockets of the disc (FIGS. 6c and 6d),
- a step of axial alignment of the ring and the disc (not illustrated) and of axial movement of the ring carrying the blades towards the disc, until the roots of the blades engage in the sockets of the disc, and
- a step of rigidly attaching the blades of a ring and removal of the ring.

The blades 110 are thus mounted on the ring 130 before being moved in translation and assembled together on the disc. The ring may comprise notches which can receive the roots of the blades. This ring is characterised by having a diameter which can be modified. It may be a ring divided into sectors for which each sector is independent. By increasing the diameter of the ring, the space between the blades is increased, which enables easy mounting by movement in translation of the blades. Once all the blades are mounted on the ring, a mechanism brings them together until having the diameter of the disc. The insertion of the blades in the disc is performed by axial translation of the assembly of blades of the ring towards the disc.

The invention has several advantages over the prior art:
- limiting radial movements of the platform during operation (the solution with iso-overhang displays a reduction by half of the maximum radial movements compared with an integrated platform with straight cut, which has been demonstrated by calculation);
- limiting the step between the portions of the platform on the suction-face and pressure-face sides, by optimising the width of overhang between the two portions.

Overall, this solution allows an improvement in aerodynamic performance of the integrated platforms and therefore of a wheel comprising blades according to the invention. The proposed solution also ensures better holding of the platform joints, which are mounted between two platforms of adjacent blades, because they are less stressed by shearing between adjacent platforms.

The invention claimed is:

1. Rotor blade made of composite material, with an integrated platform, for an aircraft turbine engine, comprising a root connected to an aerofoil and having a connection platform between the root and the aerofoil, the root having a generally elongate shape along an axis of elongation which is substantially parallel to an axis of rotation of the blade, the aerofoil having a curved cross-sectional shape and comprising a pressure face and a suction face, the platform comprising a first portion extending on the pressure-face side of the aerofoil and comprising a first longitudinal free edge and a second opposite longitudinal edge for connecting to the rest of the blade, the platform comprising a second portion extending on the suction-face side of the aerofoil and comprising a third longitudinal free edge and an opposite fourth longitudinal edge for connecting to the rest of the blade, the first longitudinal free edge being concave and the third longitudinal free edge being convex, wherein, for any plane perpendicular to said axis of elongation and intersecting said platform, the distance between the first and second edges, and the distance between the third and fourth edges, are identical in the plane considered.

2. Blade according to claim 1, wherein the root has a substantially dovetail cross-sectional shape.

3. Blade according to claim 1, wherein said blade comprises a woven fibrous base, embedded in a polymerised resin.

4. Blade according to claim 1, wherein said first and second platform portions each comprise at least one layer of fibres.

5. Aircraft turbine engine wheel, comprising a disc and a plurality of blades according to claim 1, the roots of which are fitted into sockets of complementary shape, arranged in the disc.

6. Method for assembling a wheel according to the claim 5, each blade being individually mounted by fitting its root into one of the sockets of the disc, by movement of the root in the socket, along an axis of rotation of the wheel and radially towards the interior with respect to this axis of rotation.

7. Method for assembling a wheel according to claim 5, the blades being simultaneously mounted by fitting their roots into the sockets of the disc, the method comprising:
- a step of pre-mounting the blades on a ring having a variable diameter, the blades being arranged next to one another as they should be on the disc,
- a step of reducing the diameter of the ring in such a way that the roots of the blades are arranged on a circumference of similar diameter to that of a circumference passing through the sockets of the disc,
- a step of axial alignment of the ring and the disc and of axial movement of the ring carrying the blades towards the disc, until the roots of the blades engage in the sockets of the disc, and
- a step of rigidly attaching the blades of the ring and removal of the ring.

* * * * *